United States Patent [19]

Covington

[11] 4,169,119
[45] Sep. 25, 1979

[54] METHOD OF MOLDING AN OCULAR MEMBRANE

[75] Inventor: William S. Covington, West Cornwall, Conn.

[73] Assignee: Permavision, Paramus, N.J.

[21] Appl. No.: 677,246

[22] Filed: Apr. 15, 1976

[51] Int. Cl.² ............................................ B29D 11/00
[52] U.S. Cl. ...................................... 264/1; 264/221; 264/317
[58] Field of Search ..................... 264/1, 37, 317, 221; 425/808; 351/160; 3/13

[56] References Cited

U.S. PATENT DOCUMENTS

| | | | |
|---|---|---|---|
| 2,976,576 | 3/1961 | Wichterle et al. | 351/160 |
| 3,034,403 | 5/1962 | Neefe | 3/13 |
| 3,089,232 | 5/1963 | Knight | 264/317 |
| 3,228,741 | 1/1966 | Becker | 351/160 |
| 3,422,168 | 1/1969 | Bowser | 264/1 |
| 3,423,488 | 1/1969 | Bowser | 264/1 |
| 3,518,338 | 6/1970 | Tanbussi | 264/317 |
| 3,529,054 | 9/1970 | Hepner | 264/317 |
| 3,830,460 | 8/1974 | Beattie | 425/808 |

Primary Examiner—James B. Lowe
Attorney, Agent, or Firm—Edward R. Weingram

[57] ABSTRACT

A composition which is hydrophobic but possesses excellent wettability comprising a copolymer of a polysiloxane and an ester of glycidyl alcohol and an organic acid. This copolymer is suitable for the manufacture of ocular membranes worn in contact with the eye which present excellent oxygen permeability and which can be worn for extremely long periods of time and then disposed of.

A method of preparing the ocular membranes is disclosed, in which the composition is placed between disposable molds and cured therein. The cured, mechanically and optically finished ocular membranes are recovered by the destruction of said molds and without secondary operations.

The ocular membrane is a flexible, oxygen-permeable, membrane, adapted to be inserted on the eye and worn thereon continuously for periods of more than one month.

9 Claims, 13 Drawing Figures

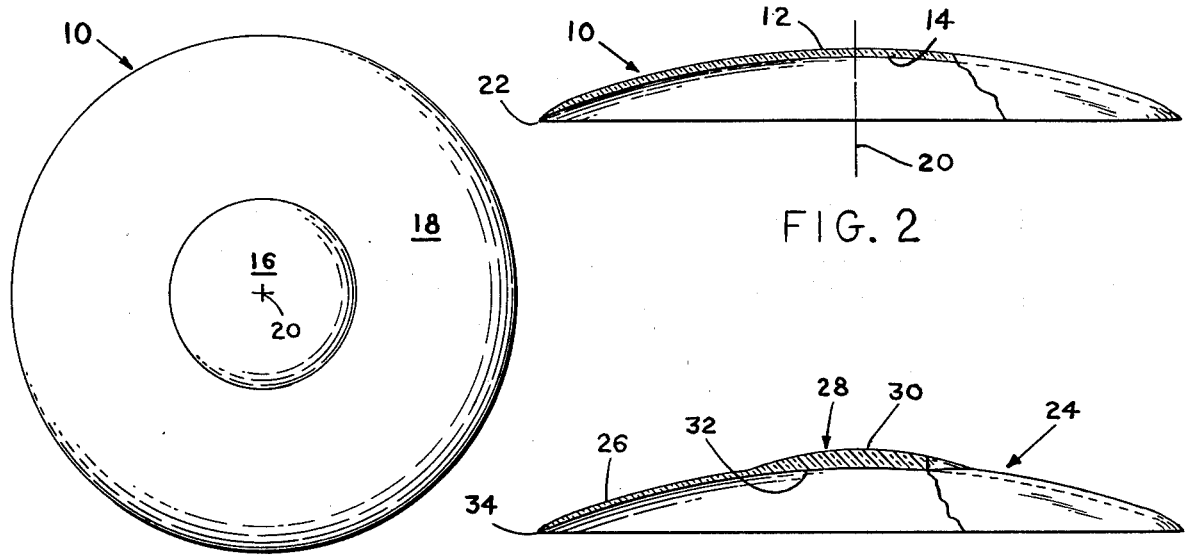
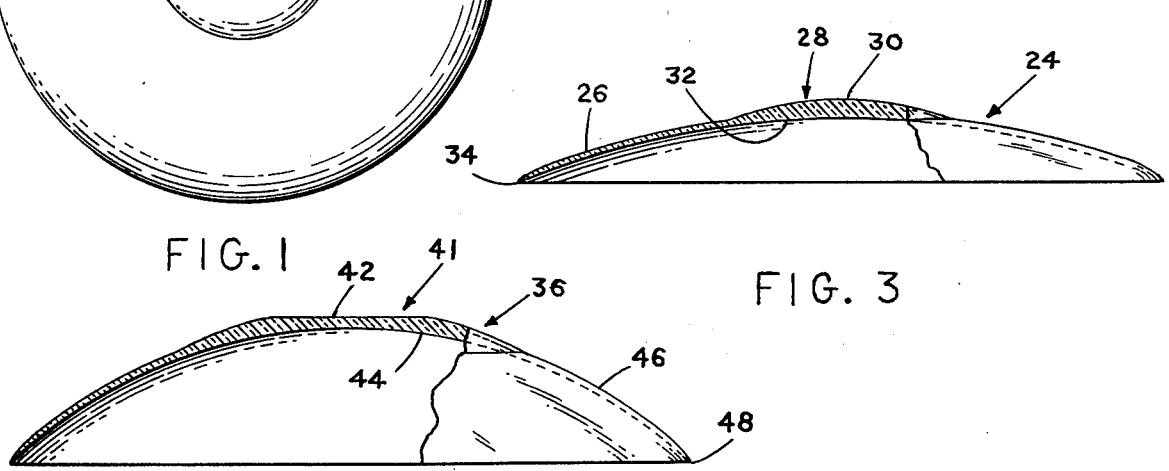
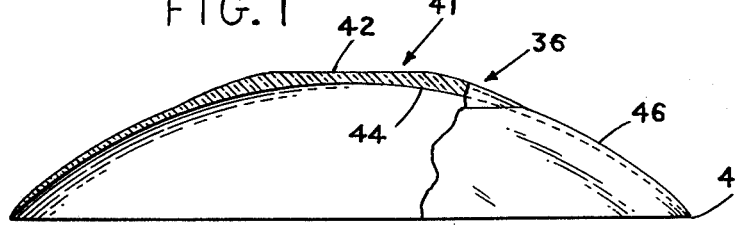
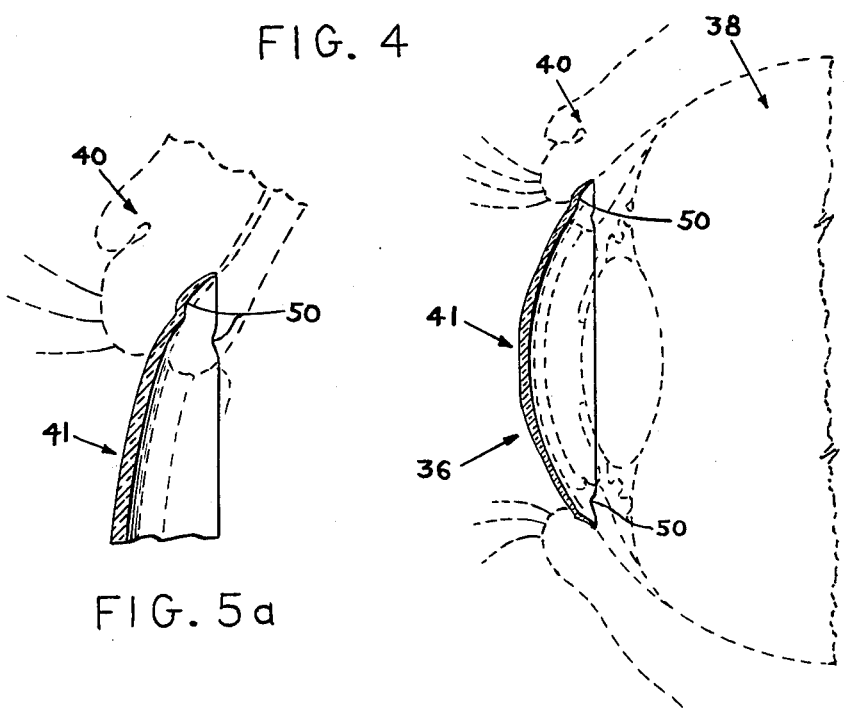

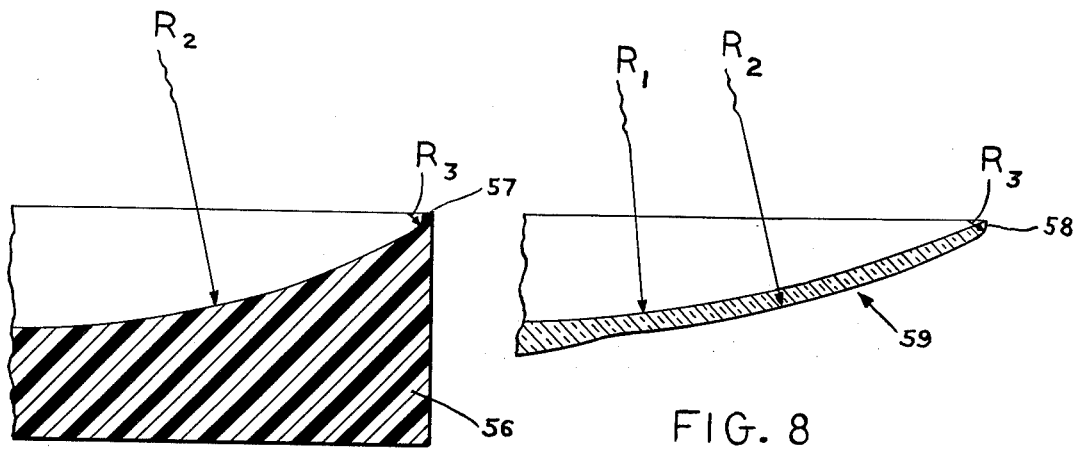
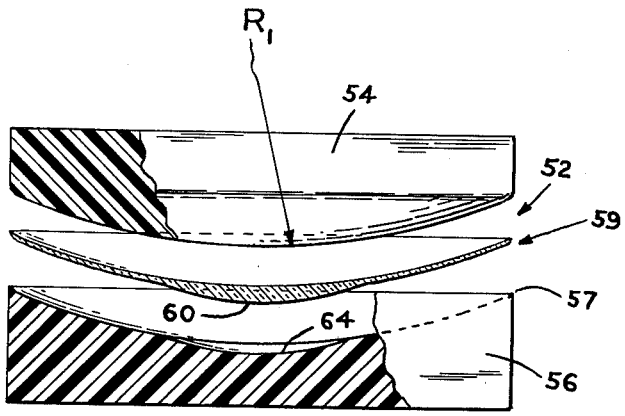
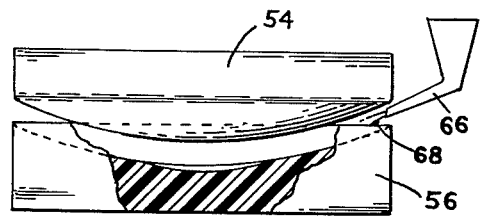
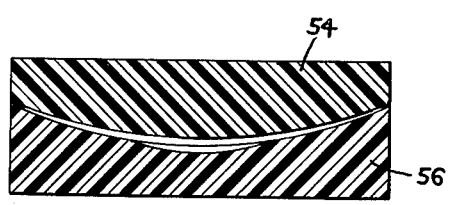
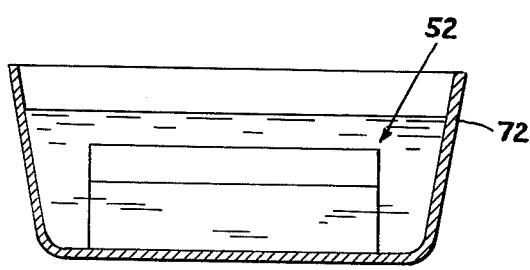
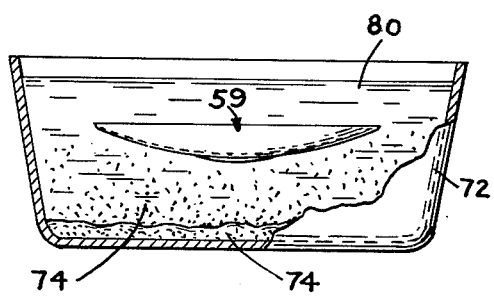

METHOD OF MOLDING AN OCULAR MEMBRANE

BACKGROUND OF THE INVENTION

1. Field of the Invention

This invention relates to the field of copolymeric compositions suitable for use in forming contact lenses. More particularly, the invention concerns a disposable, ultrathin ocular membrane formed from the aforementioned composition, which membranes can be worn for long periods of time without discomfort; the method of making such a membrane, and the membrane itself.

2. Description of the Prior Art

Optical contact lenses are conventionally made of either hard plastic such as acrylic resins or materials which have been treated to make them hydrophilic and water swellable (the so-called "soft lens"). The resins utilized conventionally must, of course, possess the various properties required for the ophthalmic use with respect to their light transmission, durability, etc. However, all of the known lenses present the basic defect that they cannot be worn regularly in the eye for long periods of time, i.e. for more than about fourteen to eighteen hours. Most certainly, their use is not recommended during sleep. Consequently, the contact lenses known to date should be inserted and removed daily from the eye.

Furthermore, those "hard" lenses made from the polymethylmethacrylate resins possess excellent rigidity and durability for handling by the user. However, they are highly impermeable to oxygen which is necessary for the proper metabolic functioning of the eye. These resins are also hydrophobic and as a result lack surface wettability. This produces fluctuations in the degree of their light transmission and refractive effect which result in changes in the visual acuity of the wearer over relatively short periods of time.

The so-called "soft" lenses, which are water swellable and hydrophilic must be maintained under conditions of sterility. This results in various inconveniences to the user.

Moreover, the "soft lenses" which are made from water swellable, hydrophilic polymers do not have the durability of the "hard" acrylic resin materials and are much more difficult to handle. Further, they are water swellable and can absorb an amount of water which is equal to many times the original volume of the lens. Consequently, the dimensions of such lenses are constantly undergoing change, which, in turn, changes the refractive index, and the refractive or ophthalmic properties of the lens.

Also, when such lenses are manufactured in the dry, unswollen state, the ultimate dimensions of the lens can vary greatly because minor deviations from standards will be amplified many times when the lens fully swells. Therefore, the "soft" lenses are relatively difficult to manufacture to the exacting tolerances required.

SUMMARY OF THE INVENTION

Applicant has discovered a copolymeric composition which is suitable for making an ocular membrane which possesses excellent optical properties and excellent permeability to oxygen and carbon dioxide. The material is hydrophobic; in other words, non-water swellable. However, the surface of the material is highly wettable.

As a result of all these properties, this material can be used to make ultrathin ocular membranes which, after initial insertion in the eye, can be worn for extended periods, for example, for several days to several months, and need not be removed daily from the eye.

Applicant has also discovered a novel method for producing the ultrathin ocular membrane of the present invention which is easily adapted to mass production methods and which will substantially reduce the cost of such membranes in relation to presently available contact lenses. Specifically, the composition of the present invention is composed of a copolymer of polysiloxane and either an ester of glycidyl alcohol and an organic acid or an anhydride. The organic acid can be acrylic acid, methacrylic acid, and crotonic acid, and the anhydride can be maleic anhydride, nadic methyl or hexahydrophthalic anhydride, all of which are hydroxyl terminated.

The amount of the ester in the copolymer is that amount which is sufficient to impart wettability to the surface of articles formed from the copolymer but which is below that amount which would make the copolymeric material water swellable.

The ocular membranes formed from such materials can have average thicknesses of less than about 0.10 mm.

Ocular membranes made from this composition are highly permeable to oxygen and carbon dioxide, which are necessary for proper metabolic functioning of the eye. The lens material is inert and non-toxic and completely compatible with the natural precorneal fluid. It also possesses excellent stability with respect to the index of refraction and transmission on the eye and thus does not cause variations in visual acuity.

Because of the complete interfacing of the cured membrane and the mold surfaces, freeing of the cured membrane from the mold surfaces without damage to the cured membrane is best accomplished by destruction of the mold surfaces in one of the following methods.

The ocular membrane of the present invention can be prepared by introducing the uncured composition of the above-noted copolymer to an ophthalmically contoured mold chamber formed from concave and convex mold members, which mold members are formed from a material which is highly soluble in a given solvent, which solvent is a non-solvent for the cured membrane copolymer.

In another approach, the mold members may be formed of a material which melts at a temperature which is non-injurious to the cured membrane copolymer.

Alternately, the mold members may be made from a material which may be destroyed by acid, base or reagents which are non-injurious to the cured membrane copolymer.

BRIEF DESCRIPTION OF THE DRAWING

FIG. 1 is a top plan view of an ocular membrane made in accordance with the present invention.

The FIGS. 2–4 are cross-sectional views of ocular membranes made in accordance with the present invention.

FIG. 5 shows an ocular membrane made in accordance with the present invention in position when operatively placed on the human eye.

FIG. 5a is an enlarged view of a portion of FIG. 5.

FIG. 6 shows the cured ocular membrane in relation to the mold surfaces used in its formation.

FIG. 7 is an enlarged view of a portion of the mold shown in FIG. 6.

FIG. 8 is an enlarged view of a portion of the ocular membrane shown in FIG. 6.

FIGS. 9-12 depict sequential steps in the process of the present invention.

DESCRIPTION OF THE PREFERRED EMBODIMENT

The first component of the composition of the present invention is a cross linkable "flexible silicon resin" which is essentially a dimethylpolysiloxane polymer. Such dimethylpolysiloxane are well known in the art and methods for preparation of such materials are well known. Typical siloxane polymers and methods for their preparation are described in detail in U.S. Pat. No. 2,560,498, the contents of which are incorporated herein by reference.

A typical polysiloxane which can be used in the present invention is dimethylpolysiloxane wherein about one percent of the methyl groups are substituted with vinyl groups. Also, however, polymethylhydrogen siloxane can be used wherein one of the methyl groups of the dimethylpolysiloxane is substituted with a hydrogen. Each of these polymers is well known and commercially available.

The molecular weight or viscosity of the polysiloxane is not critical. Of course, the viscosity of the polysiloxane must be such that it forms a pourable liquid suitable for introduction to the mold members as hereinafter described for preparation of the ocular membrane.

As is known, dimethyl polysiloxanes can be cured or cross-linked by either condensation or addition polymerization. However, in the present case, addition polymerization is preferred, since the water which is produced with condensation polymerization causes non-uniformities in the final polymer due to the escape of the water from the reaction. Also, the water which doesn't escape results in the formation of bubbles or voids in the final product.

Typical addition cross-linking polymerizations are disclosed in U.S. Pat. No. 2,970,150, incorporated herein by reference. It is also well known to include fillers such as silica and the like in such polysiloxane materials; and their use in the present composition is suitable so long as the fillers do not interfere with the desired properties of the final membrane. Typically, for example, from 0 to 50% by weight of fine powdered silica can be used for reinforcement of the polysiloxane.

Such resins are cross linked by the use of a suitable cross linking catalyst which catalysts are also well known. See, for example, U.S. Pat. No. 2,823,218, the contents of which are incorporated herein by reference. A typical catalyst is chlorplatinic acid, although many other perfectly satisfactory cross linking catalysts are known to the skilled artisan and are readily available commercially.

The cross linked resins formed from the resin systems are extremely hydrophobic. Thus, they are not suitable for use as a contact lens, although they possess the transparency, mechanical strength, durability and dimensional stability required.

Consequently, in the present invention, the resin is copolymerized with an ester of glycidyl alcohol or an anhydride. The amount of the ester or anhydride which is used in the copolymer is that amount which is effective to impart wettability to the surface of articles formed therefrom, namely, an ocular membrane, but in an amount less than that which would make the polymeric composition hydrophilic, in other words, water swellable.

Many acids can be used to esterify the glycidyl alcohol. The choice of the acid shall depend upon the factors such as the ability of the resulting ester to impart satisfactory wetting properties to the surface of the ocular membrane and yet not interfere with the properties required for use as an ocular membrane, e.g. light transmission, gas permeability, etc., and the availability and reactivity of the acid with the alcohol.

Particularly, the esters suitable for use in the copolymer of the present invention are esters of glycidyl alcohol and an acid selected from the group consisting of acrylic acid, methacrylic acid and crotonic acid. The anhydride suitable for use is selected from the group consisting of maleic anhydride, nadic methyl anhydride and hexahydrophthalic anhydride.

As used herein, the term "wettability" means that the surface of optical membranes or contact lenses formed from the composition wet sufficiently so as to maintain uninterrupted refractive functioning. Particularly, the ocular membrane formed from the composition will exhibit contact angles in normal saline solution between zero and thirty degrees.

At the same time, however, the composition must not be rendered so hydrophilic as to absorb any significant amount of water and/or discharge water into the liquid medium covering the eye, i.e., the precorneal fluid. As noted hereinabove, this is one of the basic disadvantages of the so-called "soft lens" now in use. Thus, as used herein, the expression "hydrophilic" means that the composition does absorb water to a sufficient amount so that it becomes a reservoir for continuous water exchange during the presence of the membrane or lens in the eye.

It is clear that the skilled artisan can determine the exact balance of wettability and hydropobic properties required for the specific ocular membrane being contemplated.

Generally, I have found that the amount of the ester should range from about 0.3 to three parts by weight based upon the total weight of the copolymer in order to produce the most satisfactory balance of wettability and hydrophobic properties.

The copolymeric composition of the present invention is formed by first preparing the ester of the glycidyl alcohol and separately, a mixture forming the flexible silicon resin by mixing dimethylpolysiloxane with an appropriate silicon hydride, e.g. methylhydrogenpolysiloxane with the catalyst. The mixture of the glycidyl ester with an appropriate catalyst therein, generally, for example, a peroxide or free radical catalyst is then mixed into the silicon resin mixture. This mixing generally is carried out at room temperature and atmospheric pressure.

Thereafter, the composition is placed in an appropriate ophthalmic mold, as described hereinafter, and the final mixture is subjected to polymerization conditions to form the desired copolymeric product. Typically, such polymerization conditions are from about 40° to 90° C. and preferably from about 65° to 85° C. for a time period varying from about two to twelve hours, especially from about four to eight hours.

The mixture may also be postcured, generally at a temperature from about 100° C. to 150° C. and preferably from about 120° C. to 140° C. for a time period varying from about one to six hours. Such postcuring is generally desirable to eliminate any traces of the free radical catalyst as well as to insure complete cross linking of the composition.

More particularly, the copolymeric composition is prepared by mixing about 0.01 to 0.06 parts by weight, preferable from about 0.02 to 0.05 parts by weight, of an appropriate free radical catalyst with from about 0.3 to three parts by weight (based on the final weight of the copolymer to be prepared) and preferably from about 0.5 to 2.0 parts by weight of the appropriate glycidyl ester. The preparation of these esters are well known in the art and are commercially available.

The free radical catalysts are generally peroxides, since they are most readily available. The specific free radical catalyst used is not critical, so long as it effectively produces a source of the desired free radicals. A preferred catalyst is one which would be effective at a moderate temperature of about 50° to 90° C. Typically, organic peroxide such as benzoyl peroxide, acetyl peroxide, lauroyl peroxide, decanoyl peroxide, caprylyl peroxide and the like can be used.

The mixing of the ester and the peroxide is carried out by agitation and is not particularly critical. As noted, the mixing of the ester and the peroxide may generally be carried out at about room temperature.

An appropriate polysiloxane mixture as the second component is then prepared, for example, by adding about one to twenty-five parts by weight and preferably about five to twenty parts by weight of methylhydrogenpolysiloxane to about one hundred parts by weight of the elastomeric resin, i.e. the dimethylpolysiloxane.

This mixing can also be carried out at about room temperature and the speed of mixing is not particularly critical.

The first and second mixtures are then added to one another and mixed by agitation. This final mixture should then be degassed by applying a vacuum to remove any air bubbles.

If desired, prior to subjecting the mixture to the final polymerization conditions, one could add conventional additives in the art, such as, for example, pigments and the like. Typical pigments used in the optical art include organic pigments such as daoxazione, napthol, aluminumlate, and various inorganic pigments, such as, titanium dioxide, hydrated chrome, ultramarine blue, and the like. Obviously, any coloring pigments utilized must be non-toxic and must remain stable in the presence of the oxidizing agent utilized in the polymerization. Typically, for example, about 0.0001 to 0.01 parts by weight of a pigment will be used, depending upon the desired depth and shade of the color.

Also, as noted, known reinforcing fillers, e.g., fine silica, may be used in the present composition in amounts which do not detrimentally affect the desired properties. From about 1% to 50% by weight of such filler, based on the weight of the polysiloxane, may be used, and preferably about 2% to 9% of such filler.

The finished copolymer is a hydrophobic material but which possesses a surface wettability with normal saline as measured by a contact angle of about 0° to 30° at ambient temperature.

Additionally, this final copolymer is highly permeable to oxygen and carbon dioxide but is inert and non-toxic and completely compatible with the human eye. Moreover, being hydrophobic, it does not swell with water and can be made to conform closely and naturally to the most intricate ocular topography. It possesses a stable index of refraction under all conditions and is durable, flexible and transparent. Moreover, it does not support bacterial growth and is ideally suited for making the disposable ocular membranes of the present invention.

Referring to the drawing, FIG. 1 shows a plan view of an ocular membrane formed from the composition of the present invention, while FIGS. 2, 3 and 4 show cross-sectional views of ocular membranes formed from the composition of the present invention. Of course, the specific shape of the membrane itself will depend upon the specific ophthalmic prescription required.

FIGS. 1 and 2 show a plano membrane generally indicated at 10 having an anterior surface 12 and a posterior surface 14. The pupillary zone of the membrane 16 is concentrically disposed with the extrapupillary zone 18 about the central axis 20 of the membrane. The anterior surface meets the posterior surface at the edge 22 of the membrane in a manner to be more fully described below.

FIG. 3 shows a plus membrane generally indicated at 24 having an extrapupillary section 26 with a pupillary section 28 of a converging miniscus type, having an anterior surface 30 of the pupillary zone with a shorter radius of curvature than the posterior surface of the pupillary zone 32. The edge of the membrane 34 is formed in the same manner as that of the membrane shown in FIG. 2 and FIG. 4 to be described below.

FIGS. 4 and 5 show a minus power membrane generally indicated at 36 positioned on a human eye generally indicated at 38 partially beneath the eyelid 40. The pupillary zone 41 of membrane 36 is a minus powered miniscus consisting of an anterior surface 42 having a larger radius of curvature than the posterior pupillary surface 44.

The extrapupillary zone 46 of the membrane 36 terminates at an edge 48 which is formed by the intersecting edge curve on the anterior periphery of the membrane which intersects with the uniformly curved extrapupillary surface of the posterior surface.

The edges of the other ocular membranes also terminate in this manner which is most clearly shown in FIG. 8, where the intersecting curve designated $R_3$ is formed on the anterior periphery of the ocular membrane having a radius of curvature $R_2$, and $R_3$ intersects the uniformly curved extrapupillary posterior surface having radious of curvature $R_1$.

The important aspect of an ocular membrane of the present invention insofar as its physical form is concerned is the fact that it is extremely thin. Thus, the ocular membranes as shown would have an average extrapupillary thickness of less than about 0.10 mm. Because of this thinness and the resultant lightness and permeability of the material to oxygen and carbon dioxide, the membrane may simply be placed on the eye in the usual manner and may be retained there for a number of days, weeks and even months without adverse effects of the eye. Additionally, the thinness of the membrane coupled with the elasticity of the composition makes the membrane extremely flexible so that it is deformable by pressure of the eye lid during the normal blinking cycle. This deformation enhances circulation of the precorneal fluid further improving the metabolic compatibility of the membrane with the eye. Of course, the period of time that a given ocular membrane can be worn will depend to a great extent on the wearer and the ophthalmic prescription involved. However, it is clear that the ocular membrane of the present invention for any given wearer, can be worn for significantly greater periods than the conventional contact lenses presently known.

As seen near the periphery of membrane 36, a wrinkle or local temporary deformation 50 is produced during the blinking cycle. This wrinkle which can be compared to a wave effect on the extrapupillary surface. The wrinkle literally produces a pumping action circulating corneal liquid from beyond the periphery of the membrane to and from under the membrane in order to enhance the metabolic compatibility of the membrane with the eye.

Additionally, because the extrapupillary zone of the membrane is so thin, deformation produced by the blinking process is restricted to the extrapupillary section and does not in any way produce deformations in the pupillary zone of the membrane which would result in visual distortions to the wearer of the membrane. This is made possible because the relative thinness of the extrapupillary section produces a relatively greater flexibility in the extrapupillary section than in the pupillary section of the membrane.

Considering the property of wettability of the present composition, it is of great significance and importance that the amount of the glycidyl ester be between about 0.3 to three parts by weight, based on the total weight of the copolymer. Thus, it is only when the amount of glycidyl ester is within this range that the composition possesses the wettability required for use as an ocular membrane. As the amount of glycidyl ester exceeds the upper value of this range, the wettability again deteriorates.

| dimethylpolysiloxane (parts by weight) | glycidyl methacrylate ester (parts by weight) | wettability |
| --- | --- | --- |
| 100 | 5 | Poor |
| 100 | 3 | Fair |
| 100 | 2 | Excellent |
| 100 | 1 | Excellent |
| 100 | 0.5 | Excellent |
| 100 | 0.2 | Poor |

The wettability was determined by gonioscopy, i.e., by measuring the contact angles of the surface of the cured composition with a normal solution of sodium chloride in distilled water (0.9% sodium chloride, ambient temperature).

The present composition, after curing, has a light transmission as measured by spectrophotometer of better than eight-five percent on a one mill thick sample.

The ocular membrane of the present invention is prepared by first forming a lens mold cavity composed of two mold members, a concave member and a convex member. The convex member is a replica of the ocular surface with a small pupillary segment conforming in its geometry to the topography of the human cornea. Of course, the pupillary segment in the concave member of the mold would conform to the specifications of the opthalmic prescription.

The mold members are made from plastic materials which are soluble in solvents in which the lens copolymer is not soluble. Examples of suitable materials which can be used as the mold members include, but are not limited to, polymethylmethacrylate, ethyl cellulose, cellulose acetate, polystyrene, vinyl acetate, epoxy, methyl cellulose acetate, acrylic butadiene styrene copolymer and caranuba wax.

A die for forming the mold members is first made. It can be made from a calcium sulphate impression which, utilizing conventional methods, is formed by making an impression of the human eye or, alternatively, an impression of a life-size model of the human eye. The die is generally made of a metal, e.g., steel, chrome, or nickel.

An impression may be made of the entire sclera and cornea; a part of the sclera and all of the cornea; or alternatively, only of the cornea itself, in whole or in part. Whichever impression is made, it is, of course, ultimately transferred to the final ocular membrane. Thus, depending upon the particular prescription, the ocular membrane made according to the present process will cover either the entire sclera and all of the cornea, or only part of the sclera and all of the cornea, or only cover the cornea, in whole or in part. The convex mold possesses a configuration identical to the concave mold with the exception of a central pupillary area which possesses geometry and dimensions as dictated by the specific refractive ophthalmic prescription being used. In addition, the concave mold is so shaped so as to permit it and the convex mold to meet uniformly over the entire perimeter of the two molds when brought together.

The thermoplastic molds are made by conventional casting, injection molding, or compression molding methods utilizing metallic master dies, as previously mentioned. They may be formed from calcium sulphate impressions of the eye or, alternatively, machined to duplicate standardized models of the human eye topography over the entire range thereof. This procedure permits perfect duplication of either unique models or standard models of ocular topography through the use of various plastic materials.

The relationship of the molds and membrane is shown in FIG. 6, and the process by which the molds are used to form the membrane is shown in FIGS. 9 through 12.

In FIG. 6, the mold assembly generally indicated at 52 has a convex mold 54 positioned above a concave mold 56. The concave mold 56 has a central pupillary portion 64 and has a raised circumferential annular surface 57 or radius $R_3$ as shown in FIG. 7, which forms an edge on the membrane generally indicated at 59 by intersecting with the radius of curvature $R_1$ of the convex mold surface 54 because the circumferential annular surface 57 has a steeper radius of curvature than does the radius of curvature of the convex mold surface.

The membrane 59 is shown positioned between the upper convex mold 54 and the lower concave mold 56. The alignment of the upper or the convex mold 54 with the concave mold 56 is determined by means of the circumferential annular surface 57 or $R_3$ on the lower mold which coacts with the radius of curvature $R_1$ on the convex surface of the upper mold. The difference in the radii of curvature between the circumferential annular surface $R_3$ and the radius of curvature $R_1$ of the convex mold surface 54 produces the peripheral edge 58 of membrane 59. The pupillary section of the lens 60 will be accurately positioned with relation to the peripheral edges of the membrane as long as the upper and lower mold sections are in parallel and perpendicular alignment. This is accomplished in a manner well known in the art in which the lower mold member is allowed to slide freely on a horizontal plane so that it will automatically position itself when the upper mold member engages it.

As shown in FIG. 9, the first step in the formation of the ocular membrane is to properly position the convex and concave molds 54 and 56 respectively in vertical and horizontal alignment. Then, the copolymer liquid 68 prepared as described hereinabove is poured from a pouring spout 66 to fill the concave mold to a level sufficient to take up the entire volume that will form the membrane. The upper mold 54 is then lowered onto the lower mold to engage the lower mold and thereby to form a substantially closed mold chamber and, in the process, will expel any excess copolymer liquid which has been deposited in the lower mold.

The mold halves are then left in their engaged position for a period of time sufficient for cross linking to take place. Once this has occurred, because of the relative thinness of the ocular membrane and its intimate contact with the mold surfaces, it would be difficult if not impossible to separate the mold surfaces and remove the ocular membrane without in some way impairing the optical finish of the finished membrane.

Therefore, to avoid this step of removing the membrane from the mold surfaces, the present invention reverses the process and removes the mold from the membrane by a destruction process in which the material from which the mold is fabricated is placed in contact with another material which is incompatible with the survival of the mold material but which will have no permanent effect on the material forming the ocular membrane. This process is shown in FIGS. 11 and 12, where the mold assembly, generally indicated at 52 is positioned in a vessel 72 filled with, for example, one of the solvents in which the mold material would dissolve but which would not in any way absorb or attach the material from which the ocular membrane is produced. After a sufficient period of time, the mold will be reduced to debris 74 shown in FIG. 12 and the membrane 57 will itself float freely in the liquid.

After the membrane has floated free, it can then be removed, washed and dried and further postcuring can be accomplished if desired. Washing is generally done in a sodium chloride solution (three percent is preferred).

It should be noted that the membrane, once released from the mold, is in the finished state and that no further forming process is necessary in order to produce any optical properties of the membrane or any edge, shape or configuration on the lens.

In accordance with one embodiment of the present invention, the removal of the cured ocular membrane from the mold members is accomplished by inserting or submerging the entire assembly into a solvent for the mold members. As noted hereinabove, this solvent should be a non-solvent for the cured contact lens or ocular membrane composition but should be a good solvent for the mold material.

The following table sets forth a number of suitable plastic materials which can be used to make the mold and solvents which can be used in conjunction with them.

| Mold Material | Solvent |
| --- | --- |
| polymethyl methacrylate | acetone |
| ethyl cellulose | ethyl alcohol |
| cellulose acetate | methyl ethyl ketone |
| polystyrene | toluene |
| vinyl acetate | methyl alcohol |
| epoxy | isophorone |
| methyl cellulose acetate | water |
| acrylo butadiene styrene | methyl ethyl ketone |
| caranuba wax | benzene. |

The minimal thickness of the ocular membrane of the present invention adds to its permeability to oxygen and carbon dioxide, thereby allowing proper metabolic functioning of the eye. In particular, the thickness of the membrane produced does not exceed about 0.10 mm. except for a small pupillary portion which performs a refractive function and whose radii of curvature, anterior and posterior are determined by the required focal length as dictated by the ophthalmic prescription.

Generally, the membrane made in accordance with the present invention from the composition described herein has a stable refractive index of 1.409 under accepted standard conditions.

The following examples further illustrate the present invention.

The preferred characteristics of the present composition and contact lens are set forth below as are the methods by which they were determined, as follows:

| Property | ASTM Test Method | Range | Median |
| --- | --- | --- | --- |
| Hardness, ShoreA Durometer | D7.85 | about 15–95 | 32 |
| Specific Gravity | D1505 | about 0.95–1.04 | 1.02 |
| Tensile Strength PSI | D882 | about 100 psi–1,000 psi | 800–925 |
| Elongation % | D882 | about 120–250 | 150 |
| Tearing Strength lb. | D1004 | about 10–30 | 25 |
| Water Absorption %* | D570 | about 0–3 | 0.5 |
| Permeability to gas (Std cc)(cm thickness) / (seconds)(s of cm area)(cm Hg pressure drop) | | | |
| $O_2$ permeability | D1434 | about $(29-62) \times 10^{-9}$ | $59 \times 10^{-9}$ |
| $CO_2$ Permeability | D1434 | about $(180-315) \times 10^{-9}$ | $300 \times 100^{-9}$ |
| Index of Refraction | D542 | about 1.390–1.50 | 1.409 ± .01 |

*The water absorption of the material was determined by immersing specimen which was one-eighth inch thick in a saline solution at 80° F. It was allowed to remain for two weeks and the weight increment was measured. The weight increment was found not to exceed 0.12% of the one-eighth inch specimen.

EXAMPLE 1

One gram of glycidyl methacrylate was mixed with 0.05 grams of benzoyl peroxide. A second mixture of one hundred grams of dimethylpolysiloxane with eleven grams of methylhydrogenpolysiloxane suitably catalyzed with a trace of chlorplatinic acid. The two mixtures were mixed together and the final mixture was introduced into a casting mold. The material in the mold was cured at 75° for five hours and the resulting copolymer possessed wettability within the requirements specified hereinabove and was not hydrophilic.

EXAMPLE 2

Two grams of nadic methyl anhydride were mixed with 0.05 grams of tertiary butyl perbenzoate. A second mixture of dimethylpolysiloxane, suitably filled with about 4.5% by weight of finely divided silica filler commonly used for reinforcing elastomeric silicon resins, having a surface area of 150 to 300 square meters per gram, and methylhydrogenpolysiloxane in a ratio of 10:1, respectively, suitably catalyzed with a trace of chlorplatinic acid, was prepared and the mixture of the anhydride was added thereto. The whole was stirred thoroughly for five minutes and then deaired in a vacuum fifteen minutes.

A concave and convex mold, machined on lathes with diamond bits and polished on a single spindle vertical polisher, were prepared from polymethylmethacrylate. The polishing compound used was a mixture of tin oxide and zirconium oxide in a ratio of 1:1. The concave mold had a radius of 8.5 mm. in its optical zone and the convex mold a radius of 8.2 mm. in its optical zone. The mixture was poured into the concave mold and allowed to settle for twenty minutes. The convex mold was lowered into place in register with the concave mold.

The entire assembly was then subjected to curing conditions at 65° C. for four hours and subjected to post-curing conditions for one hour at 100° C.

Thereafter the cold assembly was immersed in acetone whereby the polymethylmethacrylate mold members dissolved and the resulting lens floated to the top. The lens after washing and drying was strong, the surface thereof was wettable and possessed a refractive power of (−)1.75 diopters.

EXAMPLE 3

One hundred grams of dimethylpolysiloxane was mixed with eleven grams of methylhydrogenpolysiloxane suitably filled and catalyzed as above, to which was added a mixture of 0.5 grams of glycidyl methacrylate which was previously mixed with 0.015 grams of tertiary butyl perbenzoate. The mixture was treated in accordance with the procedure of Example 2 and the ocular membrane having essentially the same properties was obtained.

EXAMPLE 4

One hundred grams of a mixture of dimethylpolysiloxane and methylhydrogenpolysiloxane suitably filled and catalyzed as above in a ratio of 10:1 (hereinafter referred to as "resin A") was mixed with 2.0 grams of glycidyl methacrylate which was previously mixed with 0.06 grams of benzoyl peroxide. The final viscosity of the mixture was forty centapoises.

The mixture was stirred for ten minutes at 29° C. and was then degassed in a vacuum chamber for twenty-five minutes. Thereafter, the mixture was cast on a polished flat plate of clean polymethylmethacrylate and then subjected to curing conditions at 85° C. for eight hours. A solid sheet was obtained which was then post-cured at 150° C. for four hours. The casting was permitted to cool at room temperature and was then immersed in a two percent saline solution.

After ten minutes, the casting was removed and the wetting angles determined on a contact angle goniometer (Zisman type) which was used for all of the contact angle measurement described herein. The contact angle of the casting was receding: 0°; advancing 35°±2.

EXAMPLE 5

The same procedure as set forth in Example 4 was carried out with the exception that only one gram of the glycidyl methacrylate benzoyl peroxide mixture was added. The results obtained were identical to those obtained in Example 4.

EXAMPLE 6

The same procedure outlined in Example 5 was followed except that 0.5 grams of the glycidyl methacrylate benzoyl peroxide mixture was used. The goniometric results were: receding −10°; advancing −43°±2.

EXAMPLE 7

The procedure of Example 4 was followed, except that 0.2 grams of the glycidyl methacrylate-benzoyl peroxide mixture was used. The goniometric results were: 67° receding; 88°±1 advancing.

EXAMPLE 8

In this example, the same procedure as outlined in Example 1 was used except that the glycidyl methacrylate benzoyl peroxide mixture as 2.5% of the total composition. The cured composition exhibited contact angle measurements of 12° receding and 42°±2 advancing.

EXAMPLE 9

The same procedures as followed in Example 8 were used except that the catalyzed glycidyl methacrylate was 3% of the total composition. The contact angles of the cured composition exhibited contact angles of 50° receding and 55°±1 advancing.

In Example 9 above, tertiary butyl perbenzoate was used to catalyze the glycidyl methacrylate instead of benzoyl peroxide.

Additional Examples 10, 11 and 12 were prepared using various compounds in accordance with the procedure of Example 1. The following table indicates the variations in the particular copolymeric material and catalyst used relative to the amount of resin A. The table also indicates the specific conditions used for the curing and shows that the wetting characteristics of each of the compositions was observed to be excellent.

| Additive | Catalyst | Ratio of Resin A To Additive | Cure Conditions | Wetting Characteristics |
|---|---|---|---|---|
| nadic methyl anhydride | tertiary butyl octoate | 100:2.5 | 104° C. Six hours | Excellent |
| Nadic Methyl Anhydride | Benzoyl Peroxide | 100:2.5 | 90° C.-8 hours | Excellent |
| Glycidyl acrylate | Tertiary butyl perbenzoate | 100:2.0 | 85° 12 hours | Excellent |

EXAMPLE 13

A composition was prepared in accordance with Example 1 and possessed the following properties:

| | |
|---|---|
| Shore A hardness | 32 |
| Specific gravity | 1.02 |
| Tensile strength | 92.5 PSI |
| Elongation | 150% |
| Tearing strength | 25 lbs. |
| Water absorption | 0.12 |
| Permeability to oxygen | 90,000 ml/24 hrs. |
| Index of refraction | 1.409. |

Having thus described my invention, what is intended to claim is:

1. A method for forming an ocular membrane from a polymerizable material suitable for use as a contact lens comprising the steps of:
   (a) forming opthalmically contoured concave and convex mold members adapted to engage along a continuous closed loop;
   (b) introducing an excess amount of the polymerizable material into said concave mold member;
   (c) contacting said convex mold member with said concave mold member to expel the excess polymerizable material and to form a closed mold chamber having the size and shape of the desired completed membrane;
   (d) subjecting the thus introduced polymerizable membrane to polymerization conditions to form a polymeric ocular membrane from said material possessing the contour of said closed mold chamber;
   (e) freeing the formed ocular membrane from the mold surfaces and chamber by exposing the mold members to an environment destructive of the mold chamber but not damaging to the thus formed ocular membrane.

2. The method of claim 1 wherein the introducing of the polymerizable material into said mold chamber includes the step of pouring said polymerizable material into said mold chamber.

3. The method of claim 2 in which the polymerizable material introduced into said mold chamber is a composition comprising a copolymer of a polysiloxane and a compound selected from the group consisting of:
   (a) esters of glycidyl alcohol with acrylic acid, or methacrylic acid; and
   (b) maleic anhydride, nadic anhydride or hexahydrophthalic anhydride;

the amount of each such compound in said copolymer being effective to impart wettability to the surface of articles formed from said copolymer but less than that which would destroy the hydrophobic properties of said copolymer.

4. The method of claim 2 wherein the freeing of the formed ocular membrane from the mold chamber includes the step of dissolving the mold members away from said ocular membrane with a solvent in which the mold members are soluble but in which the polymeric material is insoluble.

5. The method of claim 4 wherein the mold members are dissolved by immersing them in the solvent.

6. The method of claim 5 wherein the mold members are made of a material selected from the group consisting of polymethylmethacrylate, ethyl cellulose, cellulose acetate, polystyrene, vinyl acetate, epoxy resin, and caranuba wax.

7. The method of claim 5 wherein the solvent for said mold member is selected from the group consisting of acetone, ethyl alcohol, methylethyl ketone, toluene, methyl alcohol, isophrone, water, and benzene.

8. The method of claim 1, wherein the step of freeing the thus-formed ocular membrane from the mold chamber includes the step of deforming said mold members by exposing the mold chambers to a substance which will chemically attack the mold members without reacting with the thus-formed ocular membrane.

9. The method of claim 1 wherein the step of freeing the thus-formed ocular membrane from the mold chambers by exposing the mold chambers to environment destructive of the mold chambers includes the step of exposing the mold chambers to heat sufficient to melt the material forming the mold chambers but insufficient to damage the thus-formed ocular membrane.

* * * * *